Oct. 22, 1963

L. LERICK 3,107,569

EXPANSION BOLT WITH NUT ACTUATED EXPANSION WEDGES

Filed July 6, 1959

*INVENTOR.*
LESTER LERICK
BY Hane and Nydick
ATTORNEYS

Oct. 22, 1963  L. LERICK  3,107,569
EXPANSION BOLT WITH NUT ACTUATED EXPANSION WEDGES
Filed July 6, 1959  2 Sheets-Sheet 2
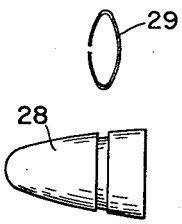
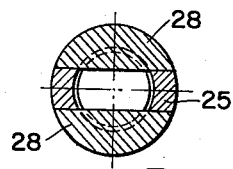
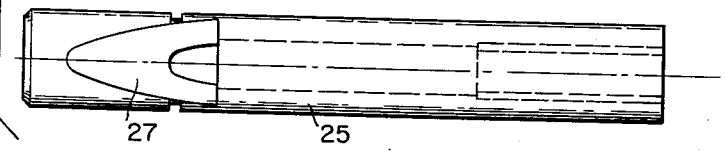
FIG. 9  FIG. 8
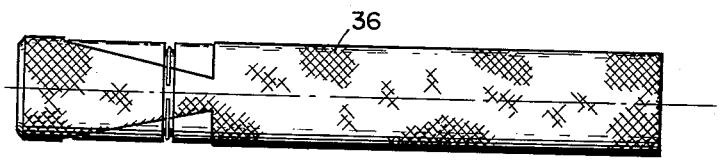
FIG. 10
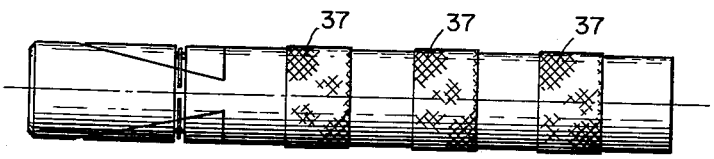
FIG. 11
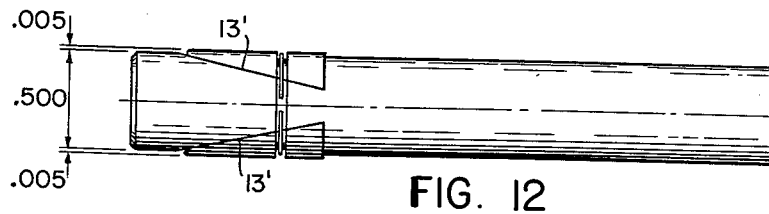
FIG. 12
INVENTOR.
LESTER LERICK
BY
ATTORNEYS

United States Patent Office 3,107,569
Patented Oct. 22, 1963

3,107,569
EXPANSION BOLT WITH NUT ACTUATED EXPANSION WEDGES
Lester Lerick, Kirel Bldg., Kingston, N.Y.
Filed July 6, 1959, Ser. No. 825,151
2 Claims. (Cl. 85—2.4)

The invention relates to expansion bolts which when located in an opening in a wall or like structure, may be expanded to grip the sides of the opening and thereby anchor themselves in the wall or like structure, and more particularly to expansion bolts in which one or several gripping or expansion elements lie within the circumference of a bolt portion prior to the anchoring or expansion of the bolt and are forced to a position protruding from the circumference by tightening an actuating member forming part of the expansion bolt.

Expansion bolts of this kind are more fully described in my copending application Serial No. 601,699, filed August 2, 1956, and issued as Patent No. 2,896,494 on July 28, 1959.

Broadly, it is the object of the present invention to provide a novel and improved design of an expansion bolt of the general kind above referred to.

More specifically, it is an object of the present invention to provide an expansion bolt which when anchored in an opening in a wall or like structure is substantially flush with the surface of the wall or like structure. Such flush mounting affords the advantage that it facilitates subsequent treatment of the wall surface such as plastering and that it is generally more attractive than protruding nuts or other elements of bolt or bolts anchored in the wall.

Still another object of the invention is to provide a novel and improved expansion bolt design which requires less and simpler machining operations than the designs as heretofore known and which can be more conveniently and rapidly assembled.

Still another object of the invention is to provide a novel and improved expansion bolt design in which the components effecting the expansion of the gripping elements of the bolt are located within the bolt rather than on the outside thereof. This affords the advantage that loosened particles of the wall or like structure cannot become lodged between said components and thereby interfere with the proper and easy function of the bolt when tightened.

A further object of the invention is to provide a novel and improved expansion bolt having means for holding the bolt stationary in its wall opening until the expansion begins.

Other and further objects, features and advantages of the invention will be pointed out hereinafter and set forth in the appended claims forming part of the application.

In the accompanying drawing, several preferred embodiments of the invention are shown by way of illustration and not by way of limitation.

In the drawing:

FIG. 8 is a section taken on line 8—8 of FIG. 6.

FIG. 9 is an exploded view of the barrel of the bolt according to FIGS. 6 and 7, one of the expansion elements thereof and the retaining means for the expansion elements.

FIG. 10 is a modification of the barrel of FIGS. 6 and 7.

FIG. 11 is another modification of the barrel of FIGS. 6 and 7, and

FIG. 12 is still another modification of the barrel of FIGS. 6 and 7.

Figure 3:
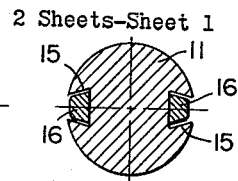
FIG. 3 is a section taken on line 3—3 of FIG. 1 on an enlarged scale.

Referring first to FIGS. 1 through 5 in detail, the expansion bolt exemplified in these figures comprises a bolt member 10 made of any suitable hard metal. Member 10 has a smooth portion 11 and a threaded portion 12 set off in relation to smooth portion 11. At the end of portion 11 opposite to the threaded portion 12, one or several recesses 13 are provided. Two diametrically spaced recesses are shown by way of example. The recesses are wedge shaped in section lengthwise of the bolt member, that is, the deepest part of the recess is toward the threaded portion 12. The base surface of the recesses is flat as can be clearly seen in FIGS. 2 and 4. An expansion or gripping member 14 is inserted in each of the recesses. Members 14 are also wedge shaped in section lengthwise of the bolt so that the slanted side of each member 14 matches approximately the slant of recesses 13 as can best be seen in FIG. 2. Each of the recesses 13 is continued in a longitudinal groove 15 which extends into threaded portion 12. The grooves 15 may extend through the entire length of bolt member 10 to facilitate machining of the grooves and grooves of such length are shown. In each groove is slidably fitted a bar or rod 16. One end of each rod protrudes into the grooved part within threaded bolt portion 12. The other end of each rod coacts with the respective expansion member 14 and for this purpose rods 16 are shown to be integral with expansion member 14, but they may also abut against the same or terminate closely thereto. Rod 16 and with it expansion member 14 are preferably retained in grooves 15 by any suitable means, for instance by lightly crimping-over the edges of the grooves or slots or dove-tailing grooves 15 and rods 16 as shown in FIG. 3.

Threaded bolt portion 12 receives an internally threaded sleeve 17 closed at one end by a flat screw head 18. The outer diameter of sleeve 17 matches preferably the outer diameter of smooth portion 11 so that the entire expansion bolt has a uniform over-all diameter. The depth of the thread in sleeve 17 is such that the sleeve can be screwed into a position in which the distance between the forward edge of sleeve 17 and the shoulder between the smooth bolt portion and the threaded bolt portion is less than the length of the rod portions protruding beyond the shoulder of smooth bolt portion 11.

Figure 1:
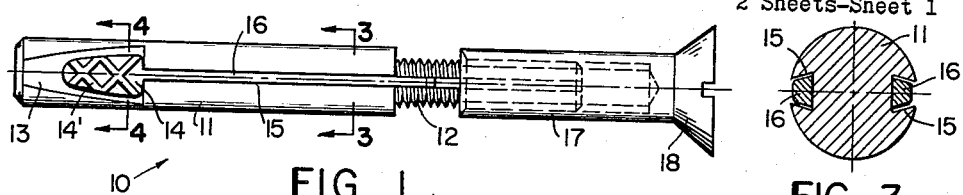
Fig. 1 is a view of the expansion bolt, the expansion of gripping elements of the bolt being shown in plan view.
Figure 2:
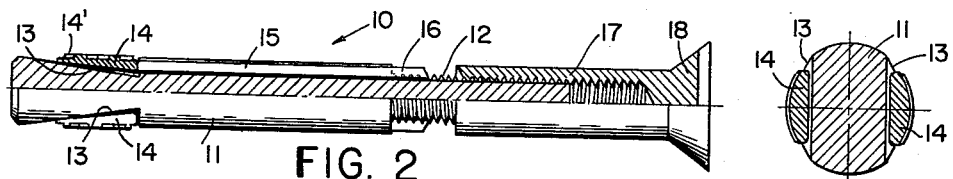
FIG. 2 is a view, partly in section, of the bolt of FIG. 1 longitudinally turned through an angle of 90°.
Figure 4:
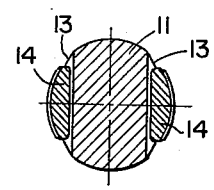
FIG. 4 is a section taken on line 4—4 of FIG. 1 on an enlarged scale.

The depth of recesses 13 and the thickness of expansion wedges 14 are so correlated that the outer surfaces of wedges 14 are within or flush with the circumference of bolt portion 11 in the position of the wedges shown in FIGS. 1, 2 and 4. This position constitutes the free or non-expanded condition of the expansion bolts in which the same may be shipped and stored and in which the bolts are inserted in a wall opening. As may be noted, there are no protruding parts which could interfere with the insertion of a bolt in an opening fitting the diameter of bolt portion 11.

In order to anchor the expansion bolt in a wall opening, sleeve 17 which constitutes the actuating member of the bolt, is screwed deeper upon bolt portion 11. As the sleeve and the bolt member 11 are telescoped together and the forward edge of sleeve 17 abuts against rods 16, the rods and wedges 14 are forced to advance toward the left hand end of the bolt member. As a result, wedges 14 are compelled to ride upwardly in recesses 13. Consequently, the wedges are no longer within the circumference of bolt portion 11, but protrude from the same radially.

Figure 5:
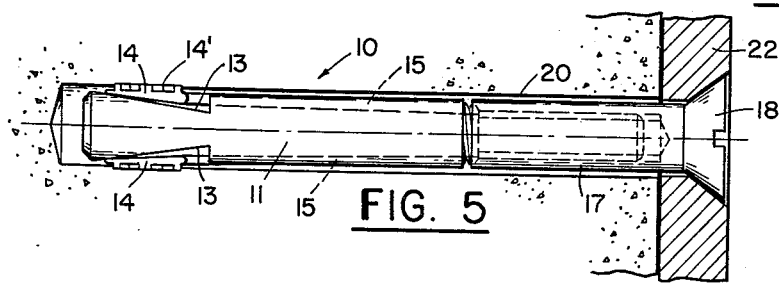
FIG. 5 is a view showing the expansion bolt of FIGS. 1 and 2 anchored in a wall opening.

FIG. 5 shows the expansion bolt inserted in a hole 20 in a wall 21 after tightening of sleeve 17. As is evident, the now protruding wedges will press against the surrounding wall material and may to a certain extent bite into the same thereby anchoring the bolt within the wall hole. To strengthen the grip between wedges 14 and the wall material, the outer surfaces of wedges 14 are preferably roughened. Cross cuts or slots 14' are shown by way of example.

FIG. 5 also shows that screw head 18 is countersunk flush in an outer wall covering 22. However, oviously screw head 18 may also be countersunk directly in wall 21 which may, for instance, be a concrete wall.

FIGS. 6, 7, 8 and 9 show an exemplification of the invention employing the same principle but different in design. According to FIGS. 6 through 9, the expansion bolt comprises a barrel or tubular metal member 25. This barrel 20 may be internally threaded along its entire length, but for functional purposes a partial threading is sufficient. Such partial threading is less expensive and is shown at 26. Near the end of barrel 25 opposite to the threaded portion 26, one or several recesses 27 wedge shaped in section lengthwise of barrel 25 are provided, again two diametrically opposite recesses are shown. The radial depth of the recesses is such that the recesses cut through the wall thickness of barrel 25 as is indicated at 25' and best shown in FIG. 9. An expansion or gripping member 28 is fitted in each of the recesses. The expansion or gripping members are again wedge-shaped in section lengthwise of the barrel and have a maximum thickness such that the inner edges of the wedges will protrude into the interior of bolt barrel 25 through the openings 25' formed in the tube wall by recesses 27 when the wedges 28 occupy a position within the outer circumference of bolt barrel 25. The wedges are retained within the recesses and in the position within the circumference of the bolt by any suitable means which have sufficient strength to retain the wedges during shipping and storage of the expansion bolts and also during insertion thereof into a wall opening, but will yield when the bolt is tightened for anchoring the same. Means suitable for the purpose are shown as a wire ring 29 which may either be slotted, or have one or several weak points at which it will break when subjected to an outwardly directed pressure by the wedges.

The actuating means of the expansion bolt comprise a bolt member 30 which preferably terminates in a flat screw head 31 and which is externally threaded along its entire length if barrel 25 is internally threaded along its entire length, or has as is shown a threaded portion 32 and a substantially smooth portion 34.

Figure 7:
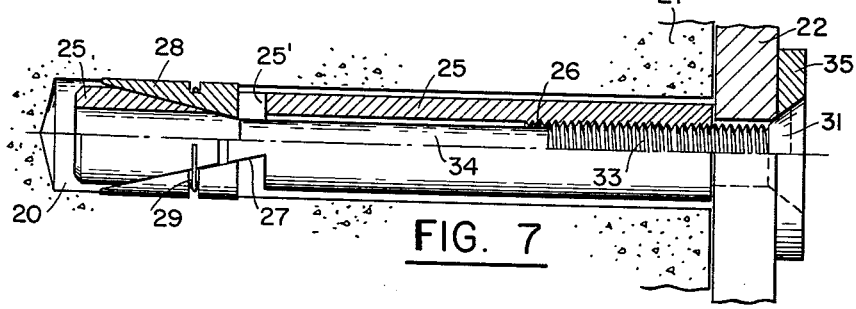
FIG. 7 is a view, partly in section, of the expansion bolt of FIG. 6 anchored in a wall opening.

Prior to the use of the expansion bolt, actuating bolt 30 is screwed out sufficiently so that the inner end of bolt portion 34 is clear of the edge of wedges 28 protruding into the interior of bolt barrel 25. When it is desired to anchor the expansion bolt after inserting the same in a wall opening 20 as shown in FIG. 7, screw bolt 30 is screwed deeper into barrel 25. As soon as the inner edge of bolt portion 34 engages the protruding wedge edges, it forces the wedges to break or expand ring 29 and ride upwardly in recesses 27 thus gripping the surrounding wall material and even biting into the same.

Screw head 31 is shown flush in a washer 35, but the screw head may, of course, also be flush with wall covering 22 or directly countersunk in wall 21.

Figure 6:
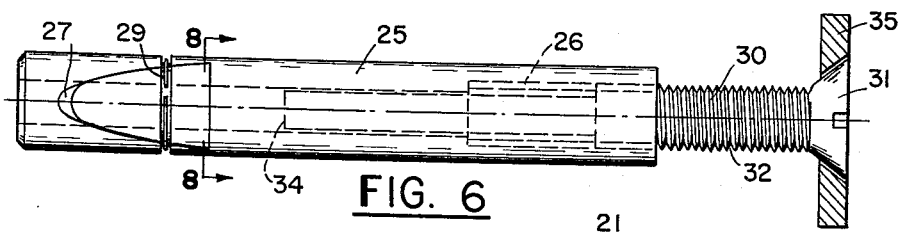
FIG. 6 is a view similar to FIG. 1, but showing a modification of the expansion bolt.

As may be noted, in the design of FIGS. 6 through 8, substantially the entire actuating mechanism is concealed within bolt barrel 25 thereby protecting the bolt mechanism from clogging by dust or wall particles which may lodge in the mechanism and interfere with the operation thereof. This is important as expansion bolts of the kind here involved are used on building sites where generally a great amount of dust is present.

As appears from the previous description, the expansion bolt according to FIGS. 1 through 4 is tightened by turning member 17 relative to member 10 and the bolt according to FIGS. 6 through 9 by turning member 30 relative to member 25. To permit such relative turning, members 10 and 25 respectively should remain substantially stationary within the respective wall openings. It has been found that there is sometimes a tendency of members 10 and 25 to turn together with the members 17 and 30 respectively, especially if the wall opening has been drilled slightly too wide.

According to FIG. 10 the outer surface of barrel 25 is overall roughened as indicated by a knurling 36. Such knurling increases the diameter of the barrel only very slightly but enough to require the barrel to be hammer-tapped into the wall opening. The resulting increased friction between the barrel and the wall material assures that the barrel will remain stationary until the expansion has sufficiently progressed to anchor the bolt.

According to FIG. 11, several longitudinally spaced, ring-shaped knurled or otherwise roughened areas 37 are provided.

FIG. 12 shows an arrangement in which an initial increased frictional contact between the barrel and the surrounding wall material is obtained by correlating the configuration of recesses 13' and the expansion wedges so that the latter protrude initially very slightly from the circumference of the barrel. There is indicated by way of example in FIG. 12 an initial wedge protrusion of .005 inch for a bolt barrel having a thickness of .500 inch.

The principle of increasing the initial friction between the bolt and the surrounding wall material as shown in FIGS. 10 through 12 for the expansion bolt according to FIGS. 6 through 9 may, of course, be applied to the bolt according to FIGS. 1 through 5.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An anchor bolt for anchorage in a wall opening, comprising a bolt member of circular cross-section having an externally threaded portion at one end and in its outer surface at least two circumferentially spaced recesses wedge shaped in section lengthwise of the bolt member, each of said recesses being continued by a groove extending into at least part of the threaded bolt portion, two anchor members inserted in said recesses longitudinally displaceable therein in either direction, each of said anchor members being also wedge shaped lengthwise of said bolt member and fitting in one longitudinal position the circumference of the bolt member but radially protruding therefrom in another longtiudinal position, a guide member fitted in each of said grooves secured at one end to the respective anchor member and protruding with the other end into said threaded bolt portion, and an actuating member for slidably advancing said anchor members toward the other end of the bolt member, said actuating member comprising an internally threaded sleeve screwed upon said threaded bolt portion, one end of said sleeve being engageable with the portions of the guide members protruding into the threaded bolt portion for axially advancing the guide members and radially extending the anchor members into a position in which the latter protrude from the circumference of the bolt member upon screwing said sleeve toward said recesses, whereby the anchor members frictionally engage a wall defining said opening and upon retraction of the bolt member and the sleeve in response to an outwardly directed pull, the anchor members are forcibly pressed against said wall, said sleeve terminating at its end opposite the end coacting with said guide members in a flat screw head positioned to be substantially flush with the outer rim of said wall opening in said advanced position of the sleeve.

2. An expansion bolt according to claim 1 wherein the outer diameter of said sleeve is at the most equal to the outer diameter of the non-threaded portion of said bolt member.

References Cited in the file of this patent

UNITED STATES PATENTS

| | | |
|---|---|---|
| 922,980 | Vernon et al. | May 25, 1909 |
| 929,979 | Pleister | Aug. 3, 1909 |
| 958,783 | Tomkinson | May 24, 1910 |
| 2,632,354 | Black | Mar. 24, 1953 |
| 2,896,494 | Lerick | July 28, 1959 |